United States Patent [19]
Mak et al.

[11] 3,822,090
[45] July 2, 1974

[54] ULTRAMICROFICHE VIEWER WITH PANTOGRAPH CONNECTION BETWEEN INFORMATION LOCATER AND FICHE CARRYING X-Y TABLE

[75] Inventors: Stephen Mak, Culver City; Homer G. Dunn, Marina Del Rey, both of Calif.

[73] Assignee: UMF Systems Incorporated, Los Angeles, Calif.

[22] Filed: June 19, 1972

[21] Appl. No.: 264,361

[52] U.S. Cl. .............................................. 353/27
[51] Int. Cl. ...................... G03b 21/10, G03b 23/08
[58] Field of Search ................................. 353/25–27

[56] References Cited
UNITED STATES PATENTS
| | | | |
|---|---|---|---|
| 3,006,245 | 10/1961 | Bycen | 33/25 R |
| 3,319,518 | 5/1967 | Carlson | 353/27 |
| 3,472,585 | 10/1969 | Halberg | 353/42 |

FOREIGN PATENTS OR APPLICATIONS
| | | | |
|---|---|---|---|
| 597,245 | 8/1959 | Italy | 353/27 |

*Primary Examiner*—Louis R. Prince
*Assistant Examiner*—A. Jason Mirabito
*Attorney, Agent, or Firm*—Harris, Kern, Wallen & Tinsley

[57] ABSTRACT

A dual focus microfiche viewing system wherein an x-y table carries a pair of superimposed transparent fiches. A map spaced from the table bears indicia corresponding to the microimages on at least one of the fiches and is large as compared to the fiches. A dual focus lens is located adjacent the superimposed fiches and is capable of focusing on either of a pair of superimposed microimages on the fiches. A locater is movable over the map to produce corresponding movement of the pair of fiches relative to the lens, such corresponding movement being produced by a pantograph having an input end connected to the locater and having an output end connected to the table. The input end of the pantograph is movable through relatively large distances proportional to the size of the map while the output end is movable through relatively small distances proportional to the size of the fiches. By positioning the locater over a desired indicium on the map, a corresponding pair of superimposed microimages is positioned in the field of the lens.

In some embodiments, the x-y table carries two pairs of superimposed transparent fiches either of which may be moved relative to the table into the field of view of the lens. The map is capable of corresponding movement to bring a corresponding set of indicia thereon into view through a windowed plate. In one embodiment, the fiches of each pair bear related information and the map is movable between two positions respectively corresponding to the pairs of fiches. In another embodiment, the fiches bear unrelated information and the map is orbitally movable between four positions spaced 90° apart and respectively corresponding to the four fiches.

In one embodiment of the invention, one microimage of each superimposed pair bears a transportation schedule from point A to point B and the other microimage of such pair bears a transportation schedule from point B to point A.

8 Claims, 13 Drawing Figures

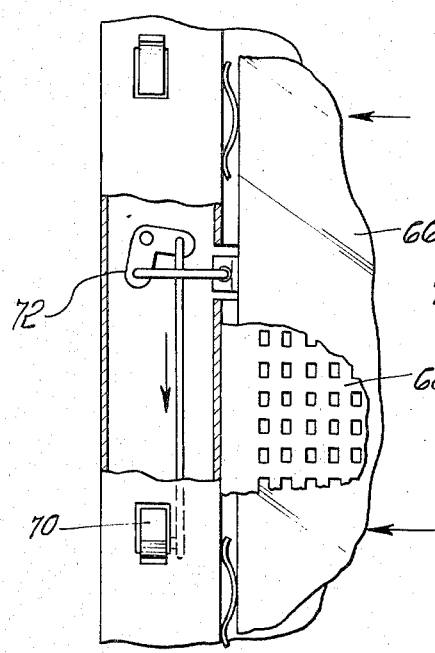
Fig. 2.
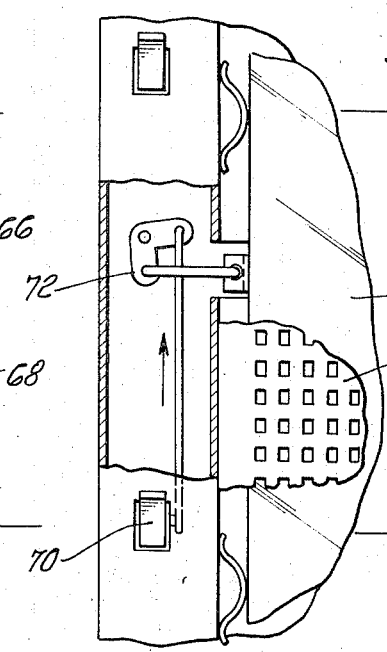
Fig. 4.
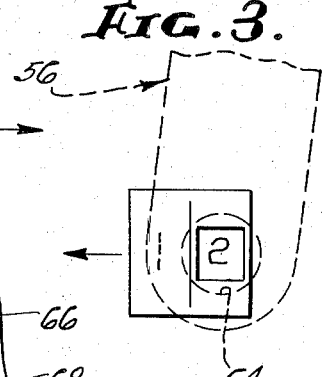
Fig. 3.
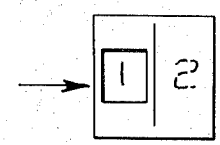
Fig. 5.
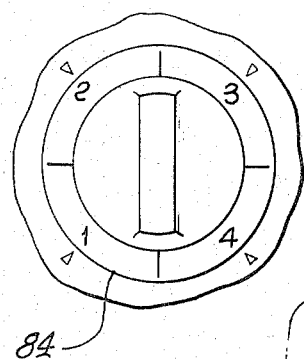
Fig. 8.
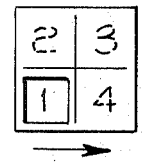 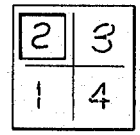 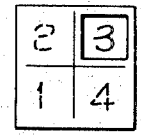 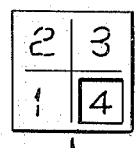
Fig. 9.
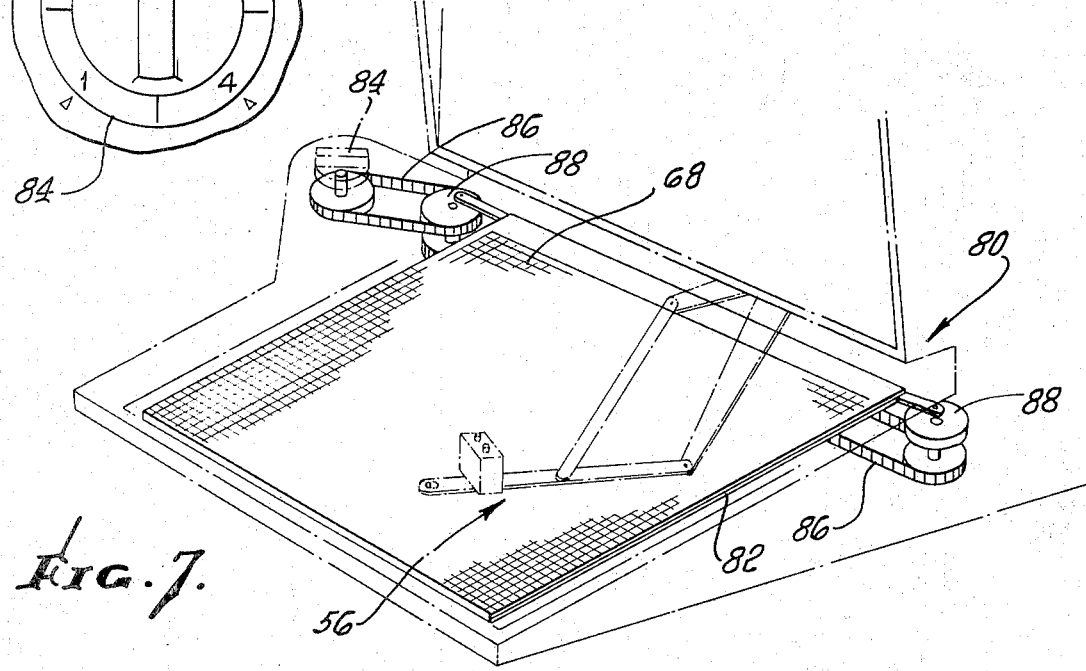
Fig. 7.

ULTRAMICROFICHE VIEWER WITH PANTOGRAPH CONNECTION BETWEEN INFORMATION LOCATER AND FICHE CARRYING x-y TABLE

CROSS REFERENCE TO RELATED APPLICATION

The present invention may utilize the microfiche spacing system disclosed and claimed in patent application Ser. No. 264,366, filed June 19, 1972, by George H. Nicholson and assigned to the same assignee as the present application.

BACKGROUND OF INVENTION

The present invention relates in general to ultramicrofiches and viewers therefor and is particularly applicable to microfiche assemblies and viewers of the dual focus type.

Pat. No. 3,391,490 to Jacob Rabinow, and Pat. No. 3,319,518 to Carl O. Carlson, disclose multiple focus microfiche viewing systems wherein microimage bearing surfaces of at least two superimposed transparent microfiches are viewed selectively by focusing on one or the other. If the microimage bearing surface being viewed is separated from the lens by another fiche or fiches, the observer literally looks through the intervening fiche or fiches. (It should be pointed out that such a dual or multiple focus system can be used only with microimages bearing line information of the type disclosed by Rabinow. More particularly, such line information may comprise letters, numerals, line drawings, or any information occupying but a small percentage of the microimage area.) Such a dual focus or multiple focus microfiche viewing system may be used where superimposed microimages bear related information, or unrelated information.

The superimposed fiches are mounted on an $x-y$ table which is movable in $x$ and $y$ directions to bring any desired pair of superimposed microimages on the pair of fiches into the field of a lens which preferably forms part of a system for projecting the desired microimage onto a screen. By focusing on one or the other of the microimages of a particular pair of superimposed images, the desired one can be viewed on the screen.

One of the problems encountered with prior viewers is that bringing the proper pair of superimposed microimages into the field of the lens is a time consuming and painstaking operation, involving some trial and error in many instances.

SUMMARY AND OBJECTS OF INVENTION

With the foregoing background in mind, a primary object of the invention is to provide a viewer having means for quickly and easily positioning the desired pair of superimposed microimages in the field of the lens.

More particularly, the invention may be summarized as including, and an important object is to provide a viewer which includes: a map spaced from the $x-y$ table and bearing indicia corresponding to the microimages on at least one of the fiches, the map being large as compared to the fiches; a locator movable over the map for locating a desired indicium on the map corresponding to a desired pair of superimposed microimages on the fiches; and a pantograph having an input end connected to the locater and movable over the map through relatively large distances proportional to the size of the map and having an output end connected to the table and movable through relatively small distances proportional to the size of the fiches. With this construction, any desired pair of superimposed microimages can be located quickly and easily simply by positioning the locater over the corresponding indicium on the map.

Another object of the invention is to provide a mounting means for the $x-y$ table having greater resistance to movement of the table in one direction than in the other. This feature is useful in instances wherein most locater and table motion occurs in, for example, the $x$ direction. In such a situation, the table has greater resistance to movement in the $y$ direction than in the $x$ direction so that indicia on the map varying in the $x$ direction can be scanned quickly and easily with little tendency of the locator to move in the $y$ direction.

Another important object of the invention is to provide a dual focus viewing system wherein the $x-y$ table carries two pairs of superimposed transparent fiches in side by side relation, each pair having spaced surfaces bearing pairs of superimposed microimages in perpendicular arrays. A related object is to provide means mounting the pairs of fiches on the $x-y$ table for movement relative thereto between a position wherein a first pair of fiches is in the field of the lens and a position wherein the second pair of fiches is in the field of the lens. The particular pair which is in the field of the lens can be shifted in such field by the pantograph hereinbefore discussed to bring any desired superimposed pair of microimages on the selected pair of fiches into the field of the lens.

Another object is to provide a dual focus viewing system of the foregoing nature wherein the fiches of the first pair bear related information, wherein the fiches of the second pair bear related information, and wherein the map bears first and second sets of indicia respectively corresponding to the first and second pairs of fiches, the viewing system further including means for displaying the first set of indicia on the map when the first pair of fiches is in the field of the lens and for displaying the second set of indicia on the map when the second pair of fiches is in the field of the lens. A related object is to provide a plate overlying the map and having a set of windows through which the first and second sets of indicia are visible selectively, the map and plate being relatively movable between a first position wherein the first set of indicia is visible through the set of windows and a second position wherein the second set of indicia is visible through the set of windows.

A further object of the invention is to provide a dual focus fiche viewing system wherein all four of the fiches on the $x-y$ table bear unrelated information, the map having four sets of indicia respectively corresponding to the information on the four fiches, and the viewing system including means for displaying the particular set of indicia on the map corresponding to the particular fiche which is in the field of the lens and which is in focus. A related object is to provide a plate overlying the map and having a set of windows through which each set of indicia on the map is visible, the viewing system including means for relatively moving the map and the plate into positions wherein the corresponding sets of indicia are visible through the set of windows. A further related object is to arrange the indicia in positions angularly spaced 90° apart, the viewing system including means for producing relative orbital movement of the map and plate from one of such positions to another.

A particularly important object of the invention in one area is to provide superimposed transparent fiches wherein one microimage of each superimposed pair bears information which is the reverse of that of the other microimage of such pair. A further important object in this connection is to provide a dual focus fiche assembly wherein one microimage of each superimposed pair bears a transportation schedule from point A to point B and the other microimage of such pair bears a transportation schedule from point B to point A.

The foregoing objects, advantages, features and results of the present invention, together with various other objects, advantages, features and results which will be evident to those skilled in the microfiche art in the light of this disclosure, may be achieved with the exemplary embodiments of the invention illustrated in the accompanying drawings and described in detail hereinafter.

DESCRIPTION OF DRAWINGS

In the drawings:

FIG. 2 is a fragmentary plan view, partially in section, and with parts broken away, taken as indicated by the arrowed line 2—2 of FIG. 1;

FIG. 4 is a view similar to FIG. 2, but showing various parts in other operating positions;

FIGS. 3 and 5 are position views respectively corresponding to FIGS. 2 and 4;

FIG. 7 is a fragmentary perspective view showing another dual focus fiche viewer of the invention;

FIG. 8 is a fragmentary plan view of a fiche selector of the viewer of FIG. 7;

FIG. 9 is a view showing successive fiche viewing positions corresponding to indicia on the selector of FIG. 8.

DESCRIPTION OF EXEMPLARY EMBODIMENTS OF INVENTION

Figure 1:
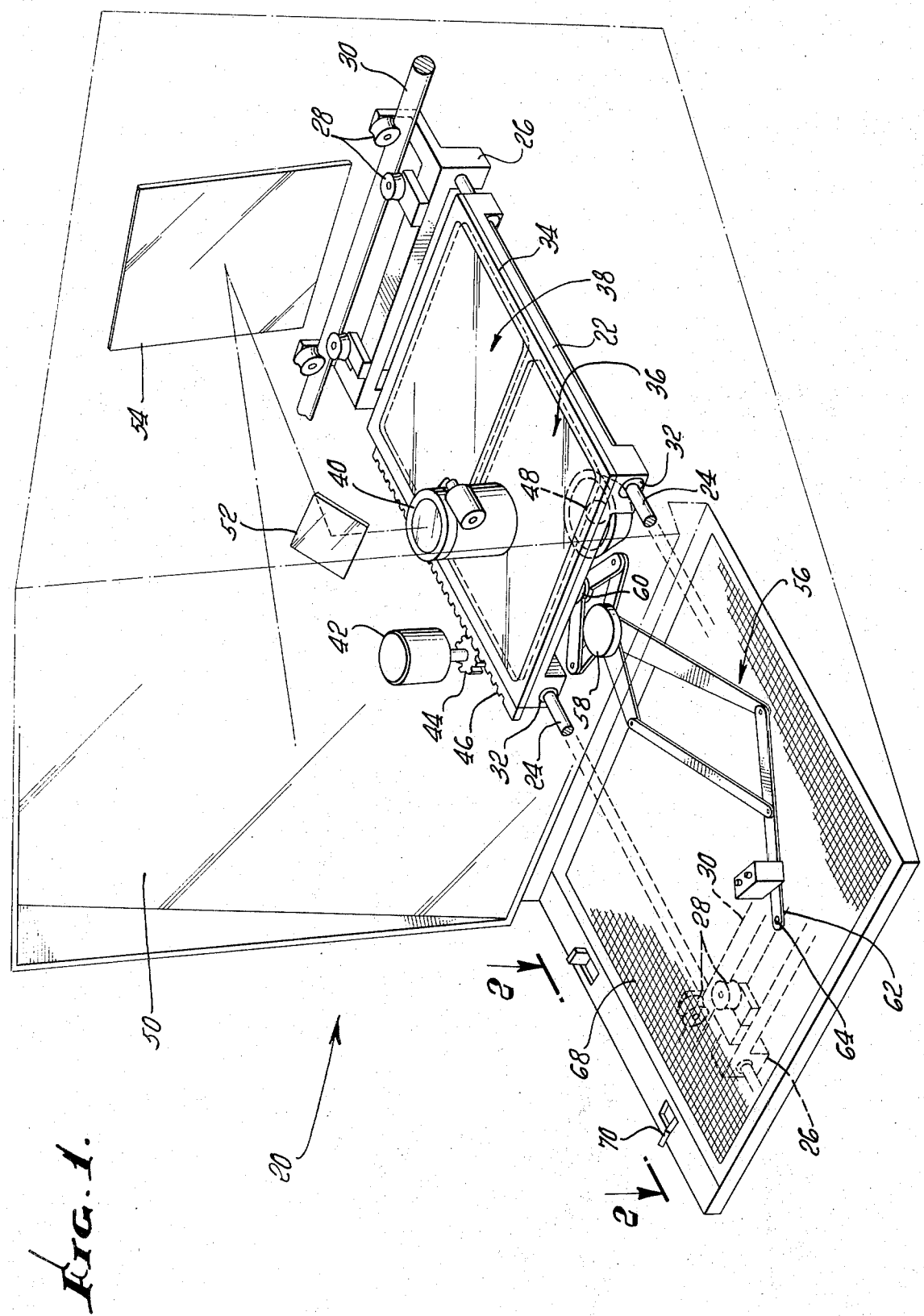
FIG. 1 is a semidiagrammatic perspective view of a dual focus fiche viewer of the invention.

Referring initially to FIG. 1 of the drawings, designated generally therein by the numeral 20 is a dual focus fiche viewer of the invention which includes an x-y table 22 slidable in the y direction on rods 24. The latter are carried by frame members 26 equipped with rollers 28 movable in the x direction on rods 30. The table 22 is equipped with bushings 32 slidable on the y rods 24.

With the foregoing construction, friction in the x direction is considerably less than friction in the y direction. Consequently, it is possible to move the table 22 in the x direction with very little tendency of the table to move in the y direction. This is important in instances where scanning in the x direction is more commonplace than scanning in the y direction, which is an important feature of the invention.

Mounted on the x-y table 22 is a fiche cassette 34 which carries pairs 36 and 38 of superimposed transparent fiches having spaced surfaces bearing pairs of superimposed microimages in perpendicular arrays, as disclosed, for example, in the aforementioned Nicholson application. Consequently, a detailed description of the pairs 36 and 38 of superimposed fiches is not necessary herein.

The cassette 34 is movable in the y direction between a first position wherein the fiche pair 36 is in the field of a lens 40 and a second position wherein the fiche pair 38 is in the field of this lens. Such movement of the cassette 34 relative to the x-y table 22 may be produced in any suitable manner, as by a motor 42 driving a pinion 44 meshed with a rack 46 on the cassette.

The optical axis of the lens 40 is perpendicular to the planes of the fiches of the pairs 36 and 38 and the lens is movable along such axis between respective positions wherein the upper and lower fiches of the particular pair in the field of the lens is in focus. Any suitable means, not shown, may be provided for shifting the lens 40 between a position wherein the microimage bearing surface on the upper fiche of a particular pair is in focus and a position wherein the microimage bearing surface on the lower fiche of such pair is in focus.

A light source 48 projects a light beam into the lens 40 through the particular superimposed pair of microimages in the field of the lens, and the particular image in focus is projected onto a screen 50 by way of mirrors 52 and 54.

Any desired pair of superimposed microimages on the fiche pair 36, or on the fiche pair 38, may be brought into the field of the lens 30 by a pantograph 56 pivoted on the frame of the viewer 20 at 58. The output end 60 of the pantograph 56 is connected to the x-y table 22. The input end 62 of the pantograph 56 carries a locater 64, which may merely be an aperture, movable over a map 66, FIGS. 2 and 4, bearing first and second sets of indicia respectively corresponding to the fiche pairs 36 and 38. Either set of indicia may be viewed through a plate 68 overlying the map 66 and having a set of windows matching the sets of indicia. As will be described hereinafter, the map 66 may be shifted linearly between a position wherein one set of indicia is visible through the windows of the plate 68 and a position wherein the other set of indicia is visible.

The map 66 is considerably larger than the fiches of the pairs 36 and 38. Thus, the input end 62 of the pantograph 56 is movable over the map 66 through relatively large distances proportional to the size of the map, while the output end 60 is movable over the selected pair of fiches 36 or 38 through relatively small distances proportional to the size of the fiches. Whenever the locater 64 is above a desired indicium on the map 66, the corresponding pair of superimposed microimages on the selected fiche pair 36 or 38 is in the field of the lens 40 for projection onto the screen 50 of the particular microimage of such pair which is in focus, the other microimage of such pair being out of focus and thus not visible.

As illustrated in FIG. 1 of the drawings, the fiche pair 36 is in the field of the lens 40 and any desired superimposed pair of microimages on the fiche pair 36 may be brought into the field of the lens 40 by moving the locater 64 into a position above the corresponding indicium on the map 66. If it is desired to bring the fiche pair 38 into play, the motor 42 is energized to shift the cassette 34 forwardly, as viewed in FIG. 1, along the y axis until the fiche pair 38 is under the lens 40.

The map 66 is shifted correspondingly to bring the corresponding set of indicia on the map into view through the windows in the window plate 68. As shown in FIGS. 2 and 4, a lever 70 is connected to the map 66 through a crank 72 to produce map movement relative to the windowed plate 68 between positions wherein the first or second sets of indicia on the map are visible. As suggested by the numeral 2 in FIG. 3, when the map 66 is in the position shown in FIG. 2, the second set of indicia is visible. As suggested by the numeral 1 in FIG. 5, when the map is in the position of FIG. 4, a first set of indicia is visible. The first set of indicia on the map 66 may correspond to the perpendicular arrays of superimposed microimages on the fiche pair 36, while the second set of indicia on the map may correspond to the perpendicular arrays of superimposed microimages on the fiche pair 38.

In using the viewer 20, the desired fiche pair 36 or 38 is brought into the field of the lens 40 and the map 66 is shifted into a position to bring the corresponding set of indicia into view through the windowed plate 68. Then, the locater 64 is moved over the windowed plate 68 until the desired indicium on the map 66 is located, which positions the corresponding pair of superimposed microimages on the fiche pair 36 or 38 in the field of the lens 40. The lens is then shifted into a position to bring either the upper or lower microimage of such pair into focus.

It will be understood that the viewer 20 may be provided with suitable controls, not shown, which automatically bring the desired fiche pair 36 and 38 into the field of the lens 40 and automatically bring the corresponding set of indicia on the map 66 into view. Thus, the operator of the viewer 20 merely needs to select the particular fiche pair 36 or 38 he desires to view, the map 66 being shifted correspondingly.

The fiches of the pairs 36 and 38 may bear microimage arrays comprising any desired information. In the particular construction shown in FIG. 1, the upper and lower fiches of each pair bear related information. For example, the upper fiche of the pair 36 may bear information on airline schedules in one direction, while the lower fiche may bear airline schedule information in the opposite direction.

Figure 6:
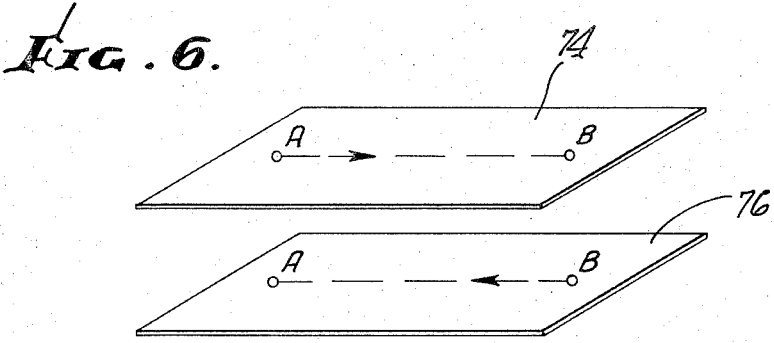
FIG. 6 is a perspective view showing superimposed fiches having inverse information thereon.
Figure 10:
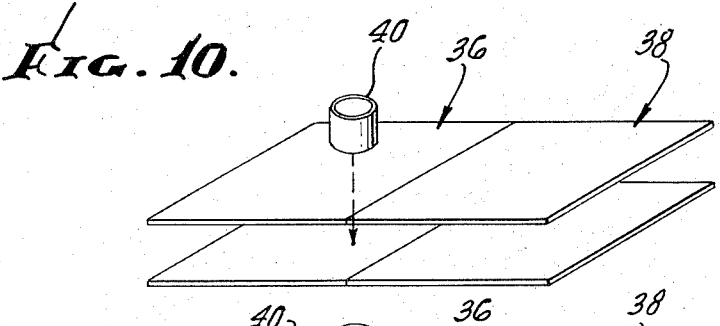
FIGS. 10 to 13 are perspective illustrations respectively showing the viewing of fiches corresponding to the indicia of FIG. 8.

The foregoing relationship is suggested in FIG. 6 of the drawings, which shows superimposed fiches 74 and 76 one bearing transportation schedule information from point A to point B and the other bearing transportation schedule information from point B to point A. By focusing on the fiche 74, one type of information is obtained, and by focusing on the fiche 76, reverse information is obtained. Merely as an example, the fiche 74 may bear airline schedules from Los Angeles to New York, and the fiche 76 may bear airline schedules from New York to Los Angeles. By focusing on the fiche 74, the desired schedule information from Los Angeles to New York may be achieved. Then, simply by shifting the lens 40 to focus on the fiche 76, information on return schedules from New York to Los Angeles may be obtained. Thus, this reversed relationship of the information on the fiches 74 and 76 represents an important feature of the invention.

It will be understood, of course, that the fiche pairs 36 and 38 may contain such information as schedules for numerous airlines throughout the United States, or even throughout the world, the simple example of information between New York and Los Angeles having been selected merely for purposes of illustration. Also, the fiche pairs 36 and 38 may contain any other desired information wherein the information on one fiche of either pair is the reverse of that on the other, or wherein the two sets of information are otherwise related.

Although, in the foregoing description, it has been stated that the map 66 is shifted relative to the windowed plate 68 to bring the desired set of indicia into view, it will be understood, of course, that the map 66 may remain stationary and the plate 68 shifted instead.

Turning now to FIGS. 7 to 13 of the drawings, illustrated therein is a viewer 80 which is similar to the viewer 20, except that the fiches of the pairs 36 and 38 bear unrelated information. In other words, there is no relationship between the information on the fiches of the pair 36, nor is there any relationship between the information on the fiches of the pair 38. Merely as an example, the four fiches of the two pairs 36 and 38 may comprise four telephone directories for different cities, or four area directories for a given city or metropolitan area.

Since the four fiches of the pairs 36 and 38 bear unrelated information, it is necessary to provide a map 82 having thereon four sets of indicia selectively visible through the set of windows of the plate 68. To minimize the size of the map 82, the four sets of indicia are arranged in circular patterns permitting exposure of successive sets by orbital movement of the map 82 relative to the plate 68.

Such orbital movement of the map 82 is produced by a selector knob 84 having the four sets of indicia noted thereon. The knob 84 is connected by chains 86 to eccentrics 88 which, in turn, are connected to the map 82 and which produce orbital movement thereof, the diameter of the map orbit depending on the eccentricity of the eccentrics 88. FIG. 9 suggests the successive positions of the map 82 relative to the windowed plate 68, showing that successive sets of indicia, identified by the numerals "1", "2", "3" and "4" are displayed.

It will be understood that suitable controls are provided to shift the map 82, the cassette 34 and the lens 40 as required to bring the proper fiche into the field of the lens 40, and to focus the lens on the proper fiches, as the map 82 is shifted throughout its range of four positions.

Figure 11:
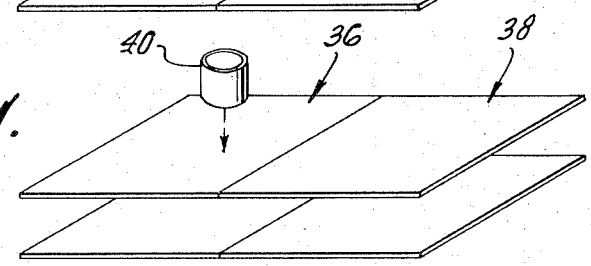
Figure 12:
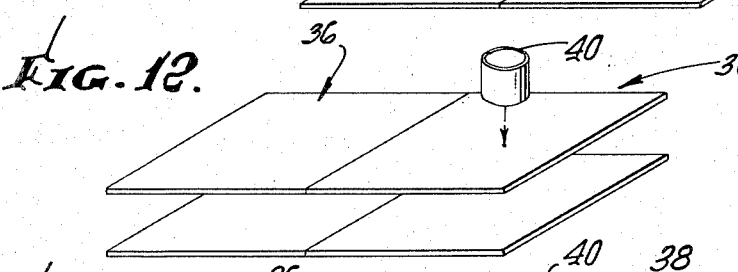
Figure 13:
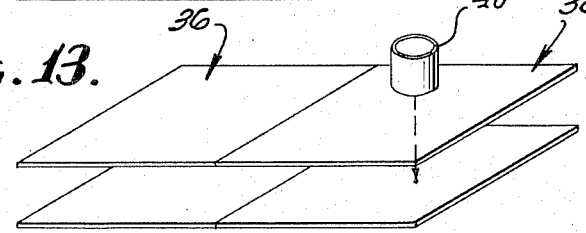

Referring to FIGS. 10 to 13, FIG. 10 shows the lens 40 focused on the lower fiche of the pair 36 in one position of the map 82. FIG. 11 shows the lens 40 focused on the upper fiche of the pair 36 in the next position of the map 82. FIG. 12 shows the cassette 34 shifted and the lens 40 focused on the upper fiche of the pair 38 in a third position of the map 82. Finally, FIG. 13 shows the lens 40 focused on the lower fiche of the pair 38 in the last position of the map 82.

Although exemplary embodiments of the invention have been disclosed for purposes of illustration, it will be understood that various changes, modifications, and substitutions may be incorporated in such embodiments without departing from the spirit of the invention as defined by the claims hereinafter appearing.

We claim as our invention:

1. In a dual focus fiche viewing system, the combination of:

an x-y table;
b. means mounting said table for movement in x and y directions;
c. a first pair of superimposed transparent fiches on said table and having spaced surfaces bearing pairs of superimposed microimages in perpendicular arrays;
d. a second pair of superimposed transparent fiches on said table adjacent the first pair and having spaced surfaces bearing pairs of superimposed microimages in perpendicular arrays;
e. a dual focus lens adjacent said superimposed fiches and capable of focusing on either of a pair of superimposed microimages on said fiches of either said first pair or said second pair;
f. means mounting said pairs of fiches on said table for movement relative thereto between a position wherein said first pair of fiches is in the field of said lens and a position wherein said second pair of fiches is in the field of said lens;
g. a map spaced from said table and bearing indicia corresponding to said microimages on at least one of said fiches of each pair, said map being large as compared to said fiches;
h. a pantograph having an input end movable over said map through relatively large distances proportional to the size of said map and having an output end connected to said table and movable through relatively small distances proportional to the size of said fiches of said pairs;
i. a locater carried by said input end of said pantograph for locating a desired indicium on said map to position a corresponding pair of superimposed microimages of a corresponding pair of fiches in the field of said lens;
j. said fiches of said first pair bearing related information;
k. said fiches of said second pair bearing related information;
l. said map bearing first and second sets of indicia respectively corresponding to said first and second pairs of fiches;
m. means for displaying said first set of indicia on said map when said first pair of fiches is in the field of said lens and for displaying said second set of indicia on said map when said second pair of fiches is in the field of said lens;
n. a plate overlying said map and having a set of windows through which said first and second sets of indicia are visible selectively; and
o. said map and said plate being relatively movable between a first position wherein said first set of indicia is visible through said set of windows and a second position wherein said second set of indicia is visible through said set of windows.

2. In a dual focus fiche viewing system, the combination of:
a. an x-y table;
b. means mounting said table for movement in x and y directions;
c. a first pair of superimposed transparent fiches on said table and having spaced surfaces bearing pairs of superimposed microimages in perpendicular arrays;
d. a second pair of superimposed transparent fiches on said table adjacent the first pair and having spaced surfaces bearing pairs of superimposed microimages in perpendicular arrays;
e. a dual focus lens adjacent said superimposed fiches and capable of focusing on either of a pair of superimposed microimages on said fiches of either said first pair or said second pair;
f. means mounting said pairs of fiches on said table for movement relative thereto between a position wherein said first pair of fiches is in the field of said lens and a position wherein said second pair of fiches is in the field of said lens;
g. a map spaced from said table and bearing indicia corresponding to said microimages on at least one of said fiches of each pair, said map being large as compared to said fiches;
h. a pantograph having an input end movable over said map through relatively large distances proportional to the size of said map and having an output end connected to said table and movable through relatively small distances proportional to the size of said fiches of said pairs;
i. a locater carried by said input end of said pantograph for locating a desired indicium on said map to position a corresponding pair of superimposed microimages of a corresponding pair of fiches in the field of said lens;
j. all four of said fiches bearing unrelated information;
k. said map having four sets of indicia respectively corresponding to the information on said four fiches; and
l. means for displaying the particular set of indicia on said map corresponding to the particular fiche which is in the field of said lens and which is in focus.

3. A dual focus fiche viewing system according to claim 2 including a plate overlying said map and having a set of windows through which each set of indicia on said map is visible, said viewing system including means for relatively moving said map and said plate into positions wherein the corresponding sets of indicia are visible through said set of windows.

4. A dual focus fiche viewing system as set forth in claim 3 wherein said sets of indicia are arranged in positions angularly spaced 90° apart, said viewing system including means for producing relative orbital movement of said map and said plate from one of said positions to another.

5. In a dual focus fiche viewing system, the combination of:
a. an x-y table;
b. means mounting said table for movement in x and y directions;
c. a pair of superimposed transparent fiches on said table and having spaced surfaces bearing pairs of superimposed microimages in perpendicular arrays;
d. a dual focus lens adjacent said superimposed fiches and capable of focusing on either of a pair of superimposed microimages on said fiches;
e. a map spaced from said table and bearing indicia corresponding to said microimages on at least one of said fiches, said map being large as compared to said fiches;
f. a pantograph having an input end movable over said map through relatively large distances proportional to the size of said map and having an output end connected to said table and movable through relatively small distances proportional to the size of said fiches;

g. a locater carried by said input end of said pantograph for locating a desired indicium on said map to position a corresponding pair of superimposed microimages in the field of said lens; and h. said mounting means for said table providing greater resistance to movement of said table in one of said directions than in the other, said mounting means including rolling means mounting said table for movement in said one direction and sliding means mounting said table for movement in said other direction.

6. In a dual focus fiche viewing system, the combination of:

a. an x-y table;

b. means mounting said table for movement in x and y directions;

c. a first pair of superimposed transparent fiches on said table and having spaced surfaces bearing pairs of superimposed microimages in perpendicular arrays;

d. a second pair of superimposed transparent fiches on said table adjacent the first pair and having spaced surfaces bearing pairs of superimposed microimages in perpendicular arrays;

e. a dual focus lens adjacent said superimposed fiches and capable of focusing on either of a pair of superimposed microimages on said fiches of either said first pair or said second pair;

f. means mounting said pairs of fiches on said table for movement relative thereto between a position wherein said first pair of fiches is in the field of said lens and a position wherein said second pair of fiches is in the field of said lens;

g. a map spaced from said table and bearing indicia corresponding to said microimages on at least one of said fiches of each pair, said map being large as compared to said fiches;

h. a pantograph having an input end movable over said map through relatively large distances proportional to the size of said map and having an output end connected to said table and movable through relatively small distances proportional to the size of said fiches of said pairs; and i. a locater carried by said input end of said pantograph for locating a desired indicium on said map to position a corresponding pair of superimposed microimages of a corresponding pair of fiches in the field of said lens.

7. A dual focus fiche viewing system according to claim 6 wherein said fiches of said first pair bear related information, wherein said fiches of said second pair bear related information, and wherein said map bears first and second sets of indicia respectively corresponding to said first and second pairs of fiches, said viewing system including means for displaying said first set of indicia on said map when said first pair of fiches is in the field of said lens and for displaying said second set of indicia on said map when said second pair of fiches is in the field of said lens.

8. In a fiche viewing system, the combination of:

a. an x-y table;

b. means mounting said table for movement in x and y directions;

c. a fiche on said table and having a surface bearing microimages in a perpendicualr array;

d. a lens adjacent said fiche;

e. a map spaced from said table and bearing indicia corresponding to said microimages on said fiche, said map being large as compared to said fiche;

f. a pantograph having an input end movable over said map through relatively large distances proportional to the size of said map and having an output end connected to said table and movable through relatively small distances proportional to the size of said fiche;

g. a locater carried by said input end of said pantograph for locating a desired indicium on said map to position a corresponding microimage in the field of said lens;

h. a second fiche on said table adjacent the first and having a surface bearing microimages in a perpendicular array; and i. means mounting said fiches on said table for movement relative thereto between a position wherein said first fiche is in the field of said lens and a position wherein said second fiche is in the field of said lens.

* * * * *